Feb. 8, 1927.  1,616,658
J. A. HEANY
MULTIPLE UNIT ELECTRIC TRANSMISSION
Filed April 15, 1920  2 Sheets-Sheet 1
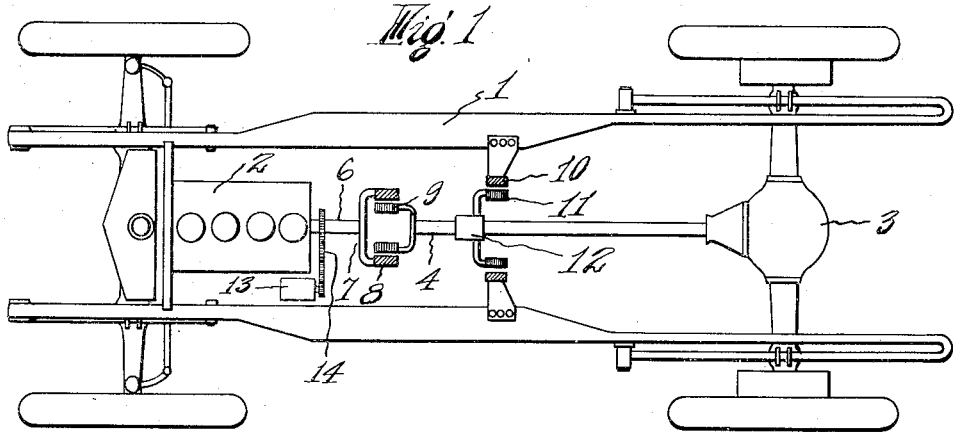
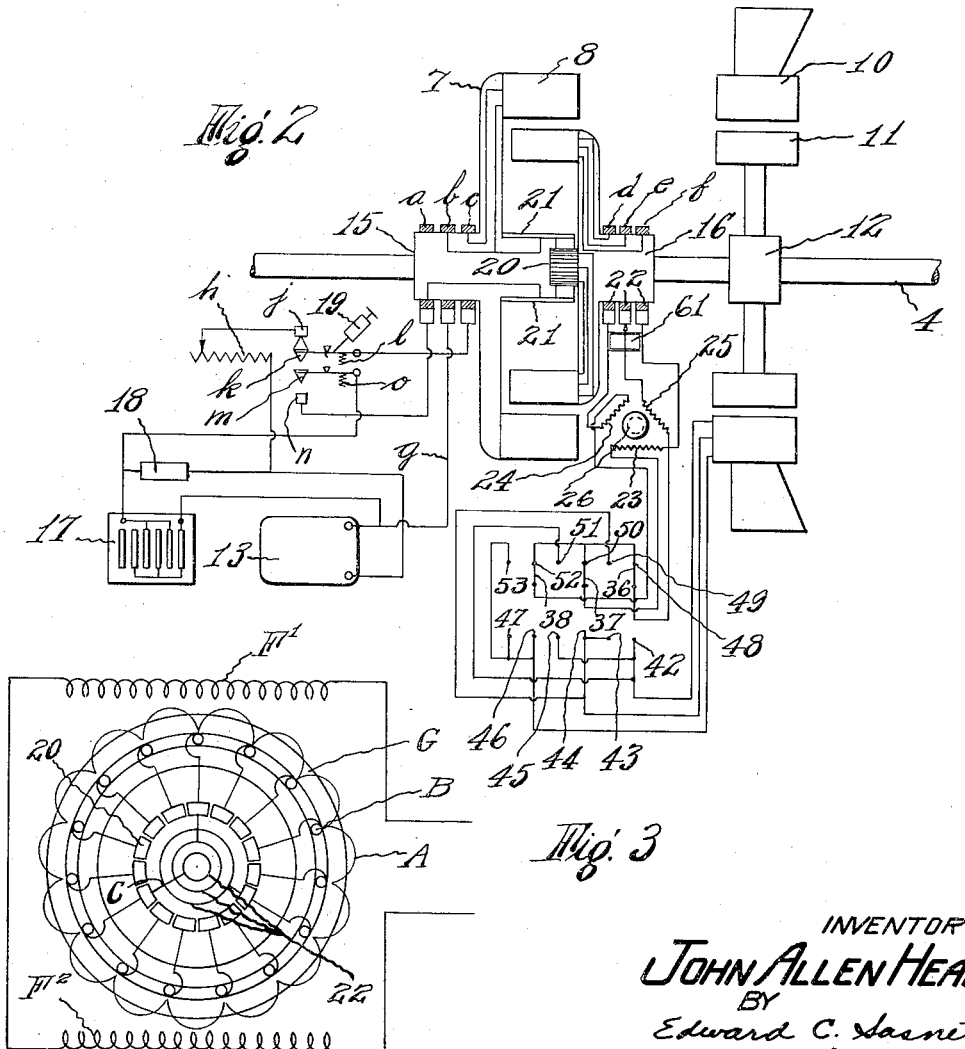
INVENTOR
John Allen Heany.
BY
Edward C. Sasnett.
ATTORNEY

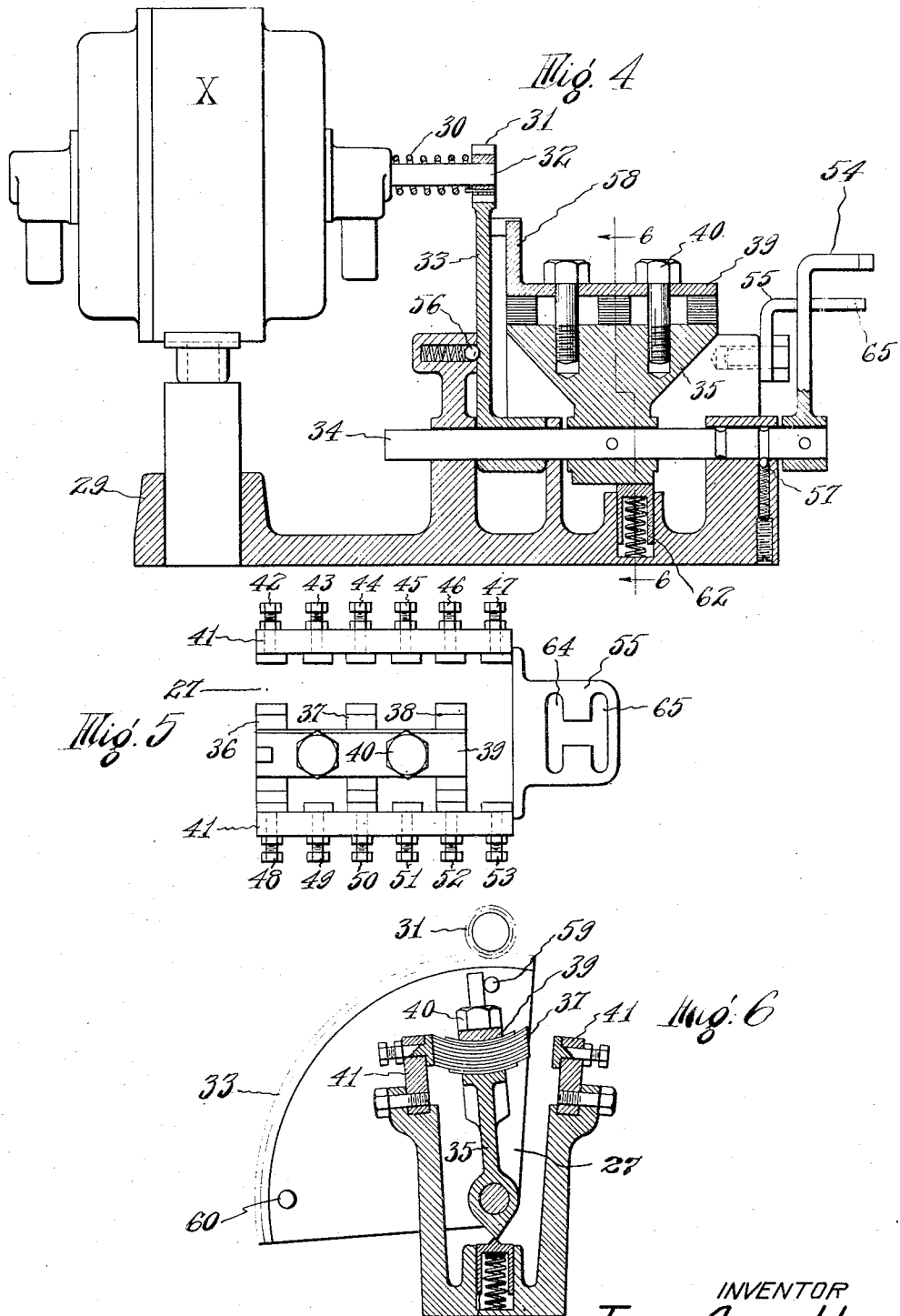

Patented Feb. 8, 1927.

1,616,658

UNITED STATES PATENT OFFICE.

JOHN ALLEN HEANY, OF NEW HAVEN, CONNECTICUT, ASSIGNOR TO HEANY LABORATORIES, INC., OF NEW HAVEN, CONNECTICUT, A CORPORATION OF CONNECTICUT.

MULTIPLE-UNIT ELECTRIC TRANSMISSION.

Application filed April 15, 1920. Serial No. 374,143.

This invention relates to power-transmitting devices, and more especially to electric transmissions of the multiple-unit type wherein two or more dynamo-electric machines are utilized to trasmit power from a prime mover or driving member to a driven member. In transmissions of this type one of the dynamo-electric machines acts as a clutch member, the field member being mechanically connected to either the drive member or the driven member and the armature to the other member. The relative rotation or slip of the two members of the clutch unit when carrying torque develops in the winding of the armature member thereof electrical energy, the current of which flowing in the armature conductors reacts with the magnetic field to produce torque applied to the armature member carried by the driven shaft and the developed electrical energy is converted by the second or other units into torque applied also to the driven shaft. This electrical energy is large or small according to the relative difference in the rate of speed of the two members of the first unit. When the difference in the rotative speed of the two members of the first unit is less than a certain amount, dependent upon the conditions of operation and the structure of the two units, the mechanical force or torque developed in the rotor of the second unit by the above referred-to electrical energy is insufficient to assist in rotating the driven shaft. At such times the torque of the system tends to decrease to zero unless some other means of absorbing the slip energy of the first unit is provided, such, for example, as an auxiliary short circuited winding on the armature of the generator.

In a copending application, Ser. No. 341,710, filed December 1, 1919, I have disclosed a transmission system in which the various units are at all times during the operation thereof electrically connected and in which the rotor of the second unit is mechanically engaged with the driven shaft at such times as the electrical energy generated in the first unit develops in the second unit sufficient torque to assist in rotating the driven shaft and automatically disengaged at other times.

The object of the invention which forms the subject matter of the present application is to provide automatic means for electrically connecting the two units electrically when the required torque exceeds the capacity of the first unit.

Other objects and advantages will become apparent as the description proceeds.

The invention consists generally of a clutch unit comprising a field member and an armature member both mounted for rotation and to cooperate electromagnetically, one being attached to the driven shaft and one to the driving shaft; a motor unit comprising an induction motor having either its primary or secondary attached to the driven shaft and the other fixed so as not to rotate; and a switch interposed between the secondary of the first unit and the primary of the second unit and responsive automatically to variations in the torque of the system, to connect electrically the two units as the torque required increases.

The motor unit may be a direct-current motor having either its field or armature attached to the driven shaft and the other to the fixed point. In the preferred form of the invention, however, the first or clutch unit generates polyphase alternating current and the second unit is an induction motor adapted to be exited by the polyphase currents generated by the first unit.

Referring to the drawings for a more specific disclosure of the invention;

Fig. 1 is a diagrammaatic view of the chassis of an automobile having the transmission made in accordance with the invention disclosed herein;

Fig. 2 is a more detailed diagrammatic view of the generator and motor, showing the starting and excitation system;

Fig. 3 is a diagram of the generator windings;

Fig. 4 is a vertical longitudinal section, parts being shown in elevation, of a switch controlling the electrical connections between the two units, and the operating means therefor;

Fig. 5 is a plan view of the switch;

Fig. 6 is a transverse section on line 6—6 of Fig. 4.

Referring now to Fig. 1, the reference character 1 designates the frame of the chassis of an automobile, the usual internal-combustion engine being shown at 2 and the differential at 3. The driven shaft 4 of the automobile is connected with the differential 3. Operatively connected to either the crank shaft 6 of the engine or the driven shaft 4, preferably the crank shaft, is the field frame 7 which carries the field windings 8 of the generator unit. The armature of the generator unit is, in this instance, carried by the driven shaft 4. Secured to the frame of the chassis in this embodiment is the primary 10 of the second or motor unit, the secondary or rotor of which is shown at 11. A constant-voltage, variable-speed, direct-current auxiliary generator 13 is coupled to the main shaft 6 of the engine through a gearing 14. The voltage of the auxiliary generator 13 is controlled by any approved means, such as the third brush or differential series field system. Obviously the auxiliary generator could be connected to the engine by any other suitable means such as by a chain or belt drive, or it could be mounted directly on and concentric with the shaft 6.

Although I have shown the clutch or generator fields connected with the prime mover, and the armature connected with the driven element, they can, if desired, be interchanged, and the latter be mounted to be rotated by the shaft of the engine. The connections between the motor and generator and the starting and excitation systems are shown more clearly in Fig. 2 in which the reference character 15 indicates a hub for slip rings $a$, $b$ and $c$, and reference character 16 indicates a hub for slip rings $d$, $e$ and $f$.

The auxiliary or direct-current generator 13 is connected to the storage battery 17 through a suitable asymmetric battery control 18, as shown. The generator is in operation whenever the engine 2 is turning, and is adapted, at such times as its generated voltage is sufficient to charge the battery 17, the latter being prevented at all times from discharging through the windings of the generator because of its connection through the battery control 18. One pole of the generator is connected by conductor $g$ to the slip ring $b$, and the other is connected through the variable resistance $h$ and contact $j$ to the slip ring $c$. The starting button indicated by the reference character 19 is arranged when operated to first move the contact $k$ out of engagement with the contact $j$ against the force of the spring $l$, and into engagement with the contact $m$, and upon further actuation forces $m$ into engagement with the contact $n$ against the force of the spring $o$, so that the contacts $k$, $m$ and $n$ are all operatively connected. The contact $k$ is connected to the slip ring $c$, the contact $n$ to the slip ring $a$, and the contact $m$ to one pole of the storage battery. The armature of the generator unit is wound as illustrated in the diagram shown in Fig. 3, in which $F_1$, $F_2$ designate the field winding 8, and G represents the slotted core of the armature having in the outer portions of its slots the winding A, and in the inner portions the winding B.

The winding A is a polyphase or distributed winding similar to that usually found on the armature of any alternating or direct-current generator and is connected to a commutator 20, the same as in direct current practice, with taps C taken to the slip rings 22 as in the case of alternating-current machines. The combination of the commutator and slip rings connected to a winding of this character is similar to that found on the armature of a rotary converter. In addition to the winding A there is placed in the bottom of the slots another winding B consisting of bars of copper or other suitable material connected to solid end rings and forming a closed circuit winding of the squirrel-cage induction type. Winding A has comparatively high resistance and low reactance. Winding B, because of the fact that it is placed deeper in the iron than winding A, has comparatively high reactance, and because of its large section, low resistance. These windings function as follows:—

When the clutch is used for starting the prime mover, direct-current electricity is led into the commutator from the battery, thence to the winding A, operating the clutch as a direct-current motor to turn the engine over. In starting the car, the prime mover, being in operation, alternating electrical energy is generated in the winding A which is taken off through the slip rings 22 to the second or motor unit of the system, in which case the torque applied to the drive shaft is the sum of the torque applied by the clutch unit and that developed in the motor. Under these conditions winding B exerts comparatively low torque. As the speed of the driven shaft increases and the slip therefore decreases, the total torque exerted thereon decreases, the torque exerted by the winding A decreasing far more in proportion than does the total torque, while that exerted by the winding B, because the impedance of the winding B is decreased at reduced slip, increases so that at normal running practically all the torque is produced by the winding B. The brushes 21 for cooperation with the commutator 20 are mounted on the field member 7. The slip ring $b$ is connected to one brush member 21 and also to the generator field winding 8, to which is also connected the slip ring $c$. The slip rings $d$, $e$ and $f$ are each connected to the generator armature winding, and through the brushes 22 to the motor primary or stator windings 10. The motor is wound as an induction motor, in which the secondary winding may consist of two or more windings in the same slots having different resistances and reactances so as to produce two or more maximum speed torque points.

Inserted in the connections between the armature of the first unit and the primary of the second unit is an electrically-operated switch for automatically opening and closing the connections between the first and second units in accordance with the torque requirements of the system. Any suitable means responsive to the fluctuations in torque of the system can be employed for operating this switch, such, for instance, as a spring compression or distortion device for measuring the torque mechanically, or a wattmeter for measuring the energy flowing from the first unit, since this energy is proportional to the torque of the system. It is also feasible to use an ammeter for this purpose, the current flow between the two units being roughly proportional to the watts over the range used.

For illustrative purposes I have shown a switch-operating means consisting of an ammeter in the form of a small induction motor.

Numerals 23, 24 and 25 designate the polyphase windings of a small induction motor X, the rotor 26 of which operates a switch 27. The polyphase windings are connected respectively to the slip rings 22 of the first unit.

Figs. 4, 5 and 6 show the operating mechanism and mechanical details of switch 27. X represents the induction motor mounted on base 29, and having connected with the rotor thereof, one end of a spring 30, the other end of which is attached to a gear wheel 31 rotatably mounted on shaft 32. 33 designates a toothed sector meshing with gear 31 and loosely mounted on a shaft 34 which is supported in bearings formed with the base plate 29 so as to be rotatable and longitudinally reciprocable therein. Pinned to shaft 34 is the bracket 35 carrying laminated switch contacts 36, 37 and 38, said contacts being held between the bracket and clamp plate 39 by bolts 40. Numeral 41 designates blocks of insulation bolted to the base plate 29 and carrying stationary contacts 42 to 53, inclusive.

Pinned to the shaft 34 is a handle 54 which works in an H-shaped slot cut in a plate 55 bolted to the base plate. 62 designates a spring-pressed locking plunger mounted in the base plate 29 and coacting with bracket 35 to hold the movable contacts 36, 37 and 38 in either their right or left hand positions and preventing said contacts from coming to rest at any intermediate position.

56 is a spring-pressed plunger or ball coacting with a recess in the gear sector 33 to hold the latter impositively in its normal position. A similar spring-pressed plunger or ball 57 cooperates with annular grooves cut in the shaft 34 to hold the switch in either its forward or reverse position.

Bracket 35 carrying the movable switch contacts is operated by the motor through the instrumentality of a pin 58 projecting from plate 39 and pins 59 and 60 attached to the gear sector 33.

The operation of the transmission system above described is as follows:

To impart to the engine its initial movement, the shaft 4 is locked in any suitable manner; for instance, it may be locked by applying the emergency brake. The starting button 19 is then pressed downwardly, first breaking contact between $k$ and $j$, thus opening the direct-current generator circuit. As the starting button 19 is pressed farther, $k$ contacts with $m$, which puts the battery in circuit with the field windings 8 of the generator unit by way of conductor $g$ slip ring $b$ thence to field winding 8 back to slip ring $c$ through conductor leading to contact $k$ to contact $m$, thence by way of battery control 18, to the other side of the generator. By further pressure upon the starting button 19, $m$ is brought into contact with $n$. At the same time $k$ remains in contact with $n$. This brings the direct-current windings of the generator armature into the battery circuit through the brushes 21 and the commutator 20. The generator then acts as a motor to turn over the engine. When the device is functioning as a starter and not as a transmission, the circuit between the two units of the transmission is preferably opened as by the switch 61, Fig. 2.

As soon as the engine is started the starting button 19 is released, breaking the contact between $n$, $m$ and $k$, and closing the contact between $k$ and $j$, thus throwing the auxiliary generator into the excitation circuit. Upon throwing out the resistance by means of the variable-resistance device $h$, the fields of the generator are excited.

The storage battery 17 is connected to the lighting and ignition system of the automobile in accordance with the practice used in cars of ordinary construction.

When the engine is running, the fields 8 of the generator unit are thereby rotated. Through means of the variable resistance $h$, the fields 8 of the generator unit are supplied with direct current from the generator 13, and by induction the armature of the generator unit is drawn around at a speed less than that of the generator field. The electrical energy developed by the relative rotation of the generator field and the generator armature will be comparatively strong or weak, and of high or low frequency, according to whether the slip between the field and the armature is large or small.

The normal position of the automatic switch between the two units is that shown in Figs. 2, 4, 5 and 6, the spring 30 operating to move the switch into this position when the motor X is unexcited. In the position shown the motor is disconnected from the generator, and the armature winding of the generator being connected through the low-resistance polyphase windings 23, 24 and 25 is practically short circuited. As the generated current flowing through the polyphase windings 23, 24 and 25 increases, the torque of motor X suffices to wind up the spring 30 and then rotate the gear sector 33, the initial movement of said sector being opposed to some extent by the spring-pressed ball plunger 56. The torque of motor X does not move the sector 33 until it has overcome spring 30 and the action of plunger 56, but when once disengaged the retarding action of the plunger is lost and the gear turns quickly until pin 60 strikes the projection 58, whereupon the motor torque plus the momentum of the moving parts carries the bracket 35 to the righthand position. The initial movement of bracket 35 is opposed by plunger 62, but the latter assists the movement of the bracket after it has passed the mid position.

The generator is now connected with the motor through the polyphase windings of motor X. When the current drops below a certain amount; that is, when the load decreases to such an extent that the generator alone is capable of supplying the required torque, the operator by means of the switch handle may rotate the switch to its original position as shown in Figs. 2 and 6, thereby disconnecting the motor and short-circuiting the generator windings.

To reverse the torque of the transmission, the handle 54 is moved from slot 64 to slot 65, thereby longitudinally moving the shaft 34 and movable switch contacts so that the latter will contact with the stationary contacts 43, 45 and 47 or 49, 51 and 53, according as said movable contacts are thrown to the left or right-hand position. In either position of the switch the motor connections are reversed and the resultant torque is therefore the difference between the torque of the motor and that of the generator, and since the torque of the motor is the stronger of the two, the resultant torque of the system is reversed.

Although the specific embodiment of the invention herein described relates to an automobile, it is obvious that it is not limited in its use to such application but is useful wherever it is desired to transmit power from a varying or constant-speeded drive element or prime mover to a driven element having varying speeds and varying torque requirements.

I claim:

1. In an electric transmission system, a driving member, a driven member, elements of a dynamo-electric machine carried by said members, and cooperating to transmit torque from one member to the other, a dynamo-electric unit arranged to apply torque to said driven member, electric connections between said dynamo-electric machine and said dynamo-electric unit whereby electrical energy generated by the relative rotation of the elements of the dynamo-electric machine is supplied to said dynamo-electric unit, a switch for controlling said electrical connection, means electrically responsive to the torque of the driven member for operating said switch, and manually-controlled means for operating said switch to reverse said electrical connections and thereby reverse the torgue of the system.

2. In an electric transmission system, the combination of a driving member, a driven member, a dynamo-electric machine interposed between the driving and driven members, a motor operatively connected to said driven member and electrically connected to said dynamo-electric machine, said motor being adapted to receive current from the dynamo-electric machine whereby torque is transmitted to the driven member, an automatic switch interposed in the electrical connections between said motor and dynamo-electric machine, and manual means operable to reverse the movement of the automatic switch and to reverse the direction of flow of current in a portion of the electric circuits between the motor and dynamo-electric machine.

JOHN ALLEN HEANY.